(No Model.)
G. W. WHATLEY.
PLOW.
No. 528,576.                    Patented Nov. 6, 1894.
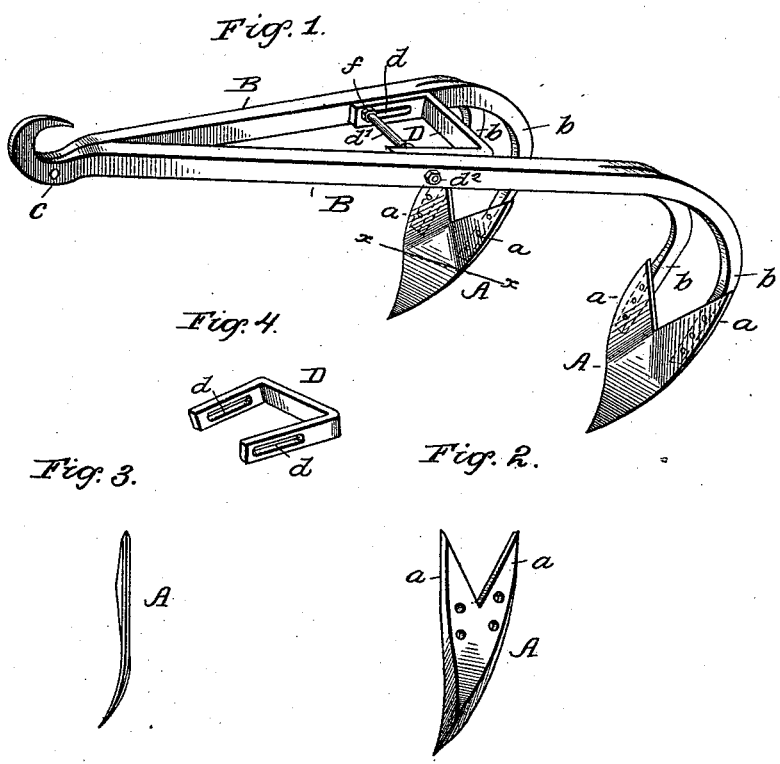
Witnesses
Victor J. Evans.
W. A. Redmond
Inventor
George W. Whatley
by
J. F. Beale.
Attorney

United States Patent Office.

GEORGE W. WHATLEY, OF PLEASANT VALLEY, TEXAS.

PLOW.

SPECIFICATION forming part of Letters Patent No. 528,576, dated November 6, 1894.

Application filed June 2, 1894. Serial No. 513,257. (No model.)

*To all whom it may concern:*

Be it known that I, GEORGE W. WHATLEY, a citizen of the United States, residing at Pleasant Valley, in the county of Dallas and State of Texas, have invented certain new and useful Improvements in Plows; and I do hereby declare the following to be a full, clear, and exact description of the invention, such as will enable others skilled in the art to which it appertains to make and use the same.

My invention relates to plows.

The object of my invention is to provide a plow adapted for use in stiff land whereby the resistance to its passage through the soil will be diminished.

It is also my object to provide a plow for this character of soil which will deposit a portion of the loosened soil in the bottom of the furrow.

It is also my object to provide a new and improved construction for double shovel plows, and means for spreading and bracing the sheaths.

In the accompanying drawings forming a part of this specification, Figure 1, is a perspective view. Fig. 2, is a rear elevation in perspective. Fig. 3, is a side view. Fig. 4, is a detail view of the spreader detached.

Referring more particularly to the drawings A, denotes the plow cut away at its central upper portion forming a V shaped opening and leaving its upper portion bifurcated, forming wings $a, a$, to which is attached a divided or bifurcated standard composed of arms, $b,b,$ which are secured by bolts or otherwise to said wings.

As shown in the drawings the plow is dished on its upper surface from the point to about midway of its length shown by the line $x\ x$ in Fig. 1, with no shear at the sides. The under side of this portion of the plow is convex, as shown in Fig. 2, the sides having an upward shear or bevel terminating in an edge at the sides and point. The wings $a, a$, are deflected backward as shown in Fig. 1. It will be seen from this construction that the soil passing over the central portion of the plow is carried directly to the V shaped opening or depression, and falls or passes between the wings $a, a$, while the soil passing on either side of the central portion is deflected to each side of said wings. The soil passing through the V shaped opening or depression, covers the bottom of the furrow while that passing to the wings falls to each side. By having the standard B, divided and the arms $b, b$, to span the V shaped opening, no obstruction is offered to the free passage of the soil through said opening. By having the under side of the plow convex near the point I lessen materially the drag of the plow in stiff soil.

In Fig. 1 I shew my improved construction for double shovel plows and my adjustable brace and spreader for the same.

B, B, denote the plow beams welded at one end to form a hook shaped clevis, and riveted together securely near the base of the weld by a rivet $c$.

D, denotes an adjustable brace or spreader shown detached in Fig. 4 and consists of a flat piece of metal bent to form two acute angles, the projecting ends having slots $d$, cut therein. $d'$, denotes a screwthreaded bolt which passes through perforations in the beams and through the slots $d$, and is held in position by nuts $d^2$, at each end. Said bolt is also provided with jam nuts $f$, which serve to clamp the spreader between the beams. To spread the beams the jam nuts $f$, and nuts $d^2$, are loosened and the spreader forced forwardly between the beams which are thus sprung apart to the required distance when said nuts and jam nuts are turned up to clamp the spreader tightly between the beams. It is evident that my spreader also acts as a brace or support for the beams.

Having shown and described my invention, what I claim, and desire to secure by Letters Patent, is—

1. A plow having a V shaped notch or recess formed in its upper central part and wings upon each side of said recess deflected backwardly whereby a portion of the upturned soil is admitted to the bottom of the furrow through said recess and a portion deflected by said wings to each side of the plow.

2. A plow having a V shaped notch or recess in its upper central part, in combination with a bifurcated standard secured upon each side of said depression.

3. In a double shovel plow having the beams united at their clevis ends, the combination of the adjustable brace and spreader D adapted to be placed between said beams and having its ends bent at an acute angle and provided with horizontal slots which register with perforations cut in said beams and a bolt and clamping nuts for securing said brace and spreader in position.

In testimony whereof I affix my signature in presence of two witnesses.

GEORGE W. WHATLEY.

Witnesses:
J. T. HAYS,
L. B. ETHRIDGE.